United States Patent
Bue et al.

(10) Patent No.: US 11,157,877 B1
(45) Date of Patent: Oct. 26, 2021

(54) SYSTEMS AND METHODS FOR AUTOMATICALLY GENERATING JOB INFORMATION

(71) Applicant: Facebook, Inc., Menlo Park, CA (US)

(72) Inventors: Erik Bue, Sunnyvale, CA (US); Sarah T. Rowe, Seattle, WA (US); Tanya Koshy, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 340 days.

(21) Appl. No.: 15/981,447

(22) Filed: May 16, 2018

(51) Int. Cl.
  *G06Q 10/10* (2012.01)
  *G06Q 10/06* (2012.01)

(52) U.S. Cl.
  CPC . *G06Q 10/1053* (2013.01); *G06Q 10/063112* (2013.01)

(58) Field of Classification Search
  None
  See application file for complete search history.

(56) References Cited

U.S. PATENT DOCUMENTS

| | | | | |
|---|---|---|---|---|
| 2013/0191299 A1* | 7/2013 | Hermsdorff | ........ | G06Q 10/1053 705/321 |
| 2013/0290206 A1* | 10/2013 | Desai | ............. | G06Q 10/063112 705/321 |
| 2014/0358607 A1* | 12/2014 | Gupta | ............ | G06Q 10/063112 705/7.14 |
| 2015/0294272 A1* | 10/2015 | Bonmassar | ......... | G06F 3/04842 705/321 |
| 2016/0098666 A1* | 4/2016 | Hojby | ............ | G06Q 10/063116 705/7.14 |

OTHER PUBLICATIONS

Harris, Finding the Best Job Applicants for a Job Posting, 2017 (Year: 2017).*

* cited by examiner

*Primary Examiner* — Mohamed N El-Bathy
(74) *Attorney, Agent, or Firm* — Sheppard Mullin Richter & Hampton LLP

(57) ABSTRACT

Systems, methods, and non-transitory computer-readable media can determine that a team within an organization has an available job position. A job posting for the available job position is generated, wherein the job posting comprises job information that has been automatically determined. The job posting is published for view by other users, such as one or more job candidates.

20 Claims, 8 Drawing Sheets

FIGURE 4B

SYSTEMS AND METHODS FOR AUTOMATICALLY GENERATING JOB INFORMATION

FIELD OF THE INVENTION

The present technology relates to the field of job posting systems. More particularly, the present technology relates to techniques for automatically creating and sharing job-related information.

BACKGROUND

Job postings can play an important role in helping organizations locate job candidates. In some instances, an organization may be looking to hire an external candidate to join the organization. In certain instances, an organization may be looking at candidates within the organization to fill vacant job positions. In either scenario, job postings can help potential candidates to become aware of available job positions, and to explore and learn about the available job positions. An organization can post a job posting corresponding to an available job position. For example, a job posting can be posted online. Candidates who view the job posting can apply for the available position by submitting information about themselves, such as a resume. A manager or other member of the organization can review potential candidates to identify candidates that may be a good fit.

SUMMARY

Various embodiments of the present disclosure can include systems, methods, and non-transitory computer readable media configured to determine that a team within an organization has an available job position. A job posting for the available job position is generated, wherein the job posting comprises job information that has been automatically determined. The job posting is published.

In an embodiment, one or more team members associated with the team are identified.

In an embodiment, the job posting identifies the one or more team members associated with the team.

In an embodiment, the job posting comprises one or more skills that have been determined based on the one or more team members associated with the team.

In an embodiment, the one or more skills are determined based on work product generated by the one or more team members In an embodiment, the determining that a team within an organization has an available job position comprises determining that the team has an available job position based on how many team members are associated with the team.

In an embodiment, the determining that a team within an organization has an available job position comprises: determining an allocated headcount for the team; determining that the team has fewer team members than the allocated headcount for the team.

In an embodiment, the job posting allows a user to view work product generated by the team.

In an embodiment, the job posting allows a user to view at least one of comments or revisions to work product generated by the team.

In an embodiment, the job posting comprises one or more tasks that have been selected by the team to be completed by job candidates that are not currently a member of the team.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIGS. 4A-4B illustrate example user interfaces, according to various embodiments of the present disclosure.

Figure 1:
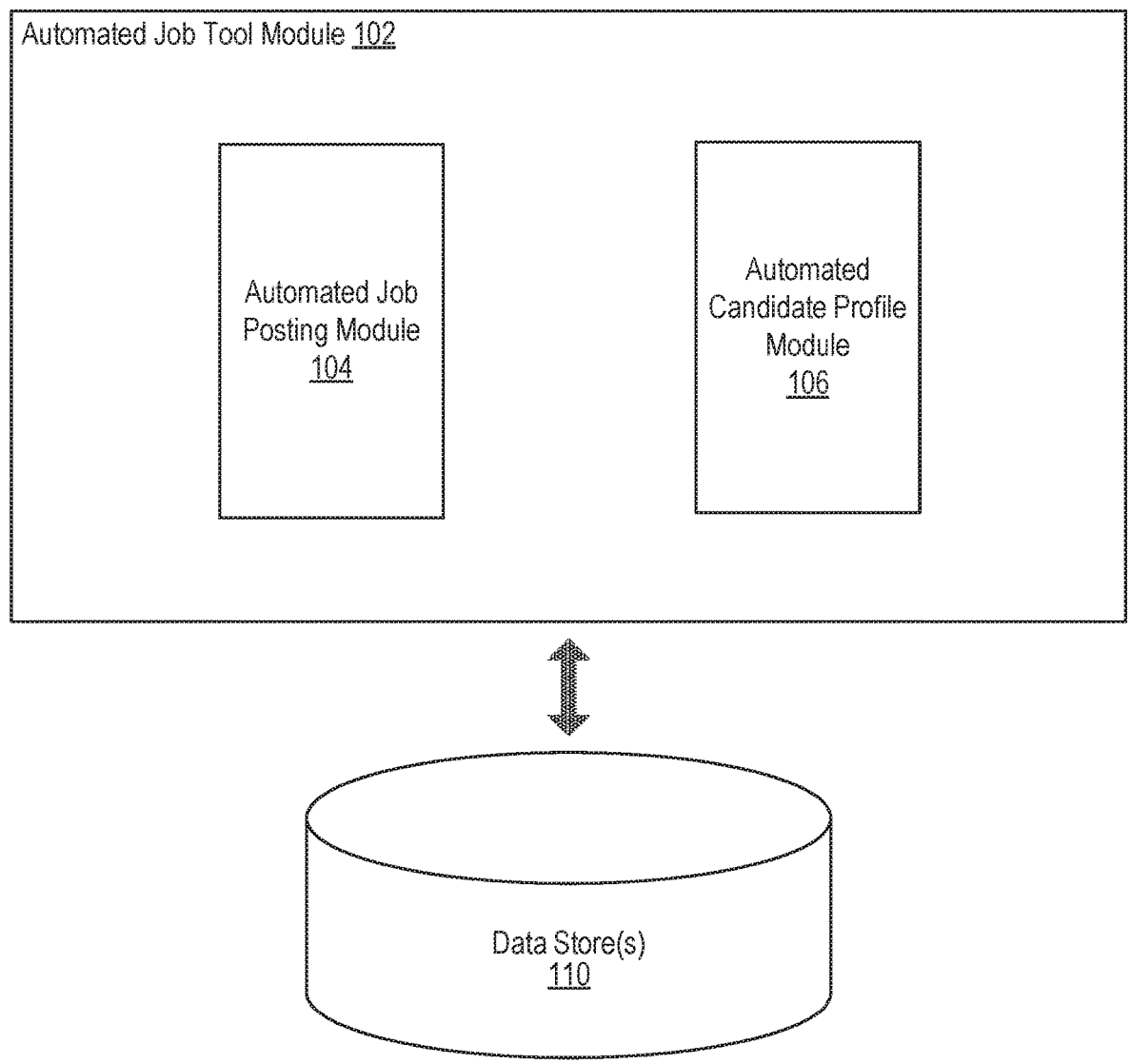
FIG. 1 illustrates an example system including an automated job tool module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Automatically Generating Job-Related Information

As mentioned, job postings can play an important role in helping organizations locate job candidates. In some instances, an organization may be looking to hire an external candidate to join the organization. In certain instances, an organization may be looking at candidates within the organization to fill vacant job positions. In either scenario, job postings can help potential candidates to become aware of available job positions, and to explore and learn about the available job positions. An organization can post a job posting corresponding to an available job position. For example, a job posting can be posted online. Candidates who view the job posting can apply for the available position by submitting information about themselves, such as a resume. A manager or other member of the organization can review potential candidates to identify candidates that may be a good fit.

An organization may have a large number of positions becoming available at a given time. Furthermore, an organization may also have a large number of positions that were previously available but have recently been filled. As such, an organization may need to generate a large number of job postings for newly available job positions, while also removing job postings for job positions that have been filled. Under conventional approaches, a member of an organization, such as a manager or recruiter, would generate a job posting for each available job position, and remove job postings as job positions become filled. However, the number of positions becoming available or being filled can create challenges for team managers or other members of an organization to keep job postings up to date. Certain conventional approaches attempt to automate these processes. However, automatically generated job postings may lack relevant information or provide inaccurate information. Furthermore, conventional approaches may still require users to identify when a job posting should be generated or removed.

An improved approach rooted in computer technology overcomes the foregoing and other disadvantages associated with conventional approaches specifically arising in the realm of computer technology. In general, an available position within an organization can be automatically identified based on headcount information. For example, an organization can maintain an information database identifying a plurality of teams, and each team being associated with one or more team members. Each team can also be associated with an allocated headcount indicative of a number of team members the team can include. In an embodiment, available job positions within a team can be automatically identified based on how many team members the team is currently associated with, and the allocated headcount for the team. For example, if a team has an allocated headcount of 9, but currently has only seven team members, it can be automatically determined that the team has two available job positions. If it is determined that a team has an available job position, a job posting can automatically be generated for the team. The job posting can include information that is inferentially obtained based on the team's current members. Once a team's available job positions have been filled, the job posting can be automatically removed (e.g., made inaccessible to other users). More details relating to the disclosed technology are provided below.

FIG. 1 illustrates an example system 100 including an automated job tool module 102, according to an embodiment of the present disclosure. As shown in the example of FIG. 1, the automated job tool module 102 can include an automated job posting module 104 and an automated candidate profile module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the automated job tool module 102 can be implemented in any suitable combinations.

In some embodiments, the automated job tool module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the automated job tool module 102 can be, in part or in whole, implemented as software running on one or more computing devices or systems, such as on a server system or a client computing device. In some instances, the automated job tool module 102 can be, in part or in whole, implemented within or configured to operate in conjunction with or be integrated with a social networking system (or service), such as a social networking system 630 of FIG. 6. Likewise, in some instances, the automated job tool module 102 can be, in part or in whole, implemented within or configured to operate in conjunction with or be integrated with a client computing device, such as the user device 610 of FIG. 6. For example, the automated job tool module 102 can be implemented as or within a dedicated application (e.g., app), a program, or an applet running on a user computing device or client computing system. The application incorporating or implementing instructions for performing functionality of the automated job tool module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The automated job tool module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the automated job tool module 102. For example, the data store 110 can store organization information, such as organization hierarchy information, team allocated headcount information, and the like, as well as team member and candidate information. It is contemplated that there can be many variations or other possibilities.

The automated job posting module 104 can be configured to automatically identify available job positions within an organization, and to automatically generate job postings for available job positions. More details regarding the automated job posting module 104 will be provided below with reference to FIG. 2.

The automated candidate profile module 106 can be configured to automatically generate a candidate profile. More details regarding the automated candidate profile module 106 will be provided below with reference to FIG. 3.

Figure 2:
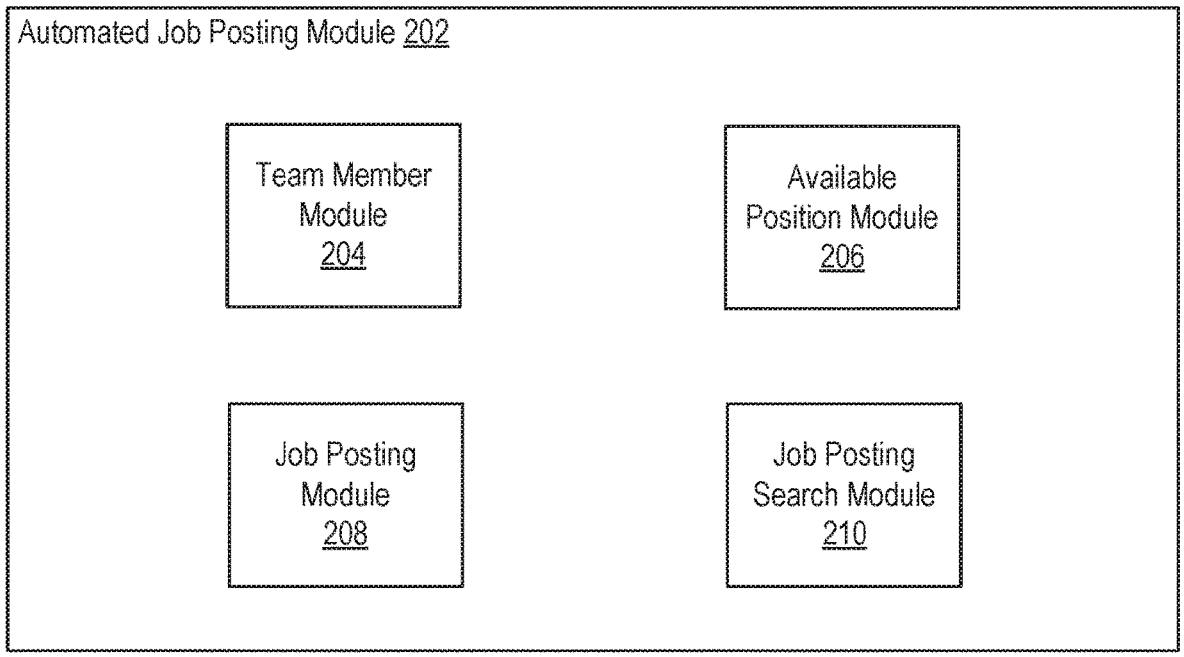
FIG. 2 illustrates an example automated job posting module, according to an embodiment of the present disclosure.

FIG. 2 illustrates an example automated job posting module 202 configured to automatically generate job postings, according to an embodiment of the present disclosure. In some embodiments, the automated job posting module 104 of FIG. 1 can be implemented as the automated job posting module 202. As shown in the example of FIG. 2, the automated job posting module 202 can include a team member module 204, an available position module 206, a job posting module 208, and a job posting search module 210.

The team member module 204 can be configured to automatically identify team members associated with a team. As discussed above, an organization can include one or more teams, and each team can include one or more team members. In an embodiment, an organization can maintain a team member database identifying each team in the organization and each team member on each team. The team member module 204 can be configured to query the team member database to identify team members on a given team.

In certain embodiments, the team member module 204 can infer team membership based on various factors. For example, if a first employee consistently interacts with a second employee (e.g., above a threshold amount of interaction), and the first and second employees consistently have work product reviewed by a first manager (e.g., above a threshold amount of work product), it can be inferred that the first manager, the first employee, and the second employee are members of a team. Such interactions between employees or sharing of work product may be stored in a transaction log, a document repository, or other similar database.

The available position module 206 can be configured to automatically identify when a team within an organization has an available job position. In an embodiment, an organization can maintain allocated headcount information for each team. The allocated headcount information may, for example, by maintained in a database. For a given team, the allocated headcount information can identify how many team members the team is permitted to include. Based on team membership information provided by the team member module 204, and the allocated headcount information, the available position module 206 can determine whether a particular team has one or more available job positions. For example, if it is determined that a first team has an allocated headcount of 12 team members, and the team member module 204 identifies 10 team members current on the first team, the available position module 206 can determine that the first team has two available job positions.

The job posting module 208 can be configured to automatically generate a job posting associated with a team based on a determination that the team has an available job position. The job posting module 208 can automatically generate job posting information to populate the job posting. Job posting information may be generated, in various embodiments, based on information maintained in one or more databases that can be queried by the job posting module 208. For example, the job posting module 208 can include within the job posting a list of team members on a team, how long each team member has been a member of the organization, how long each team member has been a part of the team, how many positions are available within the team, and the like. In an embodiment, the job posting module 208 can infer a location for an available job position based on location information associated with team members. For example, if each team member on a team is located in Seattle, the job posting module 208 can infer that an available job position within the team is also located in Seattle.

In an embodiment, the job posting module 208 can generate one or more skills required for the job posting based on work product of the team associated with the job posting. In an embodiment, the job posting module 208 can identify work product generated by team members of the team within a threshold period of time. For example, the job posting module 208 can identify files that the team members have checked into a code repository within the previous three weeks. Extensions on the files can be used to map each file to a coding language. If use of a particular coding language is above a threshold (e.g., greater than 5 files associated with the coding language have been checked in by team members within the previous three weeks), the coding language can be identified as a required or desired skill to be listed in the job posting.

In an embodiment, the job posting module 208 can automatically identify a point of contact to be listed in a job posting. For example, the job posting module 208 can identify a particular team member associated with the team associated with the job posting to be listed as a point of contact for the job posting. The particular team member may be identified, for example, based on the team member's title (e.g., a manager of the team may be identified as the point of contact).

In an embodiment, the job posting module 208 can identify a set of work product output by the team, and can provide access to the set of work product in the job posting. For example, the job posting module 208 can query a code repository to identify files that have been checked in by members of the team. A job candidate viewing the job posting can be provided with access to view the files that have been checked in by members of the team. In an embodiment, the files can include comments and revisions made by supervisors and/or other team members so that the job candidate can see how the team members interact with one another.

In an embodiment, the job posting module 208 can identify a set of tasks associated with a team, and include the set of tasks in a job posting for the team. In certain embodiments, the set of tasks may be maintained in one or more databases. The set of tasks can include tasks that have been accomplished by the team. In certain embodiments, the set of tasks can include tasks that are outstanding and still need to be completed. In one embodiment, the set of tasks can include one or more tasks that have been identified by the team for completion by users that are not current members of the team. For example, a team (e.g., a team manager or team member) can identify a discrete task that a potential candidate to join the team can complete. The discrete task can act as a trial run for the potential candidate so that the potential candidate can determine whether or not he or she would enjoy the type of work the team performs. The discrete task can also act as a data point for the team to consider when deciding whether or not the potential candidate would be a good fit for the team.

In an embodiment, the job posting module 208 can automatically identify a team's positioning within an organization. For example, an organization may maintain organization hierarchy information within one or more databases which details how the various teams within an organization are related to one another. The job posting module 208 can query the organization hierarchy information to determine a particular team's position within an organization or how the team relates to other teams within the organization. Such information can be presented within a job posting.

In an embodiment, the job posting module 208 can automatically identify one or more teams that are related to or similar to a team associated with a job posting. For example, if a job candidate is looking at a job posting associated with a first team, the job posting module 208 can provide, within the job posting, one or more other teams that are similar to the first team. In an embodiment, the job posting can allow the user to access job postings associated with the one or more teams that are similar to the first team.

In an embodiment, the job posting module 208 can identify one or more teams that are similar to a particular team based on group membership for current team members of the particular team. For example, each member of a team may be part of one or more work groups on a social networking system. The social networking system may be a work-related social networking system which includes employees of a particular organization. Employees may use the work groups, for example, to communicate with one another about particular projects and tasks. Similar teams can be determined based on overlapping team member membership in work groups. A similarity score can reflect a level of similarity between teams. For example, consider an example scenario in which a first team has a first set of team members and a second team has a second set of team members. Each team member in the first set of team members can be a member of one or more work groups, and each team member in the second set of team members can also be a member of one or more work groups. For each work group that the first set of team members has in common with the second set of team members, a similarity score between the first team and the second team can be increased. In an embodiment, similarity between teams can be determined based on common learning courses taken by team members. For example, if a first set of team members on a first team takes a first set of courses, and a second set of team members on a second team takes a second set of courses, a similarity score between the first and second teams can be increased for each course the first set of courses has in common with the second set of courses and/or for each course taken by a member of the first team that is also taken by a member of the second team.

In an embodiment, any information that has been automatically inferred or obtained for inclusion within a job posting can be edited or removed by a user. For example, a manager of a team may be provided with a user interface through which the manager can edit a job posting associated with the team.

In an embodiment, the job posting module 208 can automatically generate and publish a job posting. For example, the job posting can be published to a social networking system. In an embodiment, the job posting module 208 can automatically remove and/or unpublish the job posting based on a determination that an available job position associated with the job posting has been filled. For example, if the team member module 204 determines that a particular team has ten members, and the available position module 206 determines that the team has room for eleven members, the job posting module 208 can generate a job posting for the one available position. However, at a later time, if the team member module 204 determines that the team now has eleven members, the job posting module 208 can automatically remove the job posting.

The job posting search module 210 can be configured to provide a job search interface that job candidates can use to search for available job positions. For example, a job candidate can identify one or more keywords, or one or more filters to be applied to available job positions. The job candidate can view a listing of available job positions that satisfy the one or more keywords and/or the one or more filters. The job candidate can click into a particular job posting to view details for the job posting. For example, the job posting can include information that was automatically obtained and/or inferred by the job posting module 208.

Figure 3:
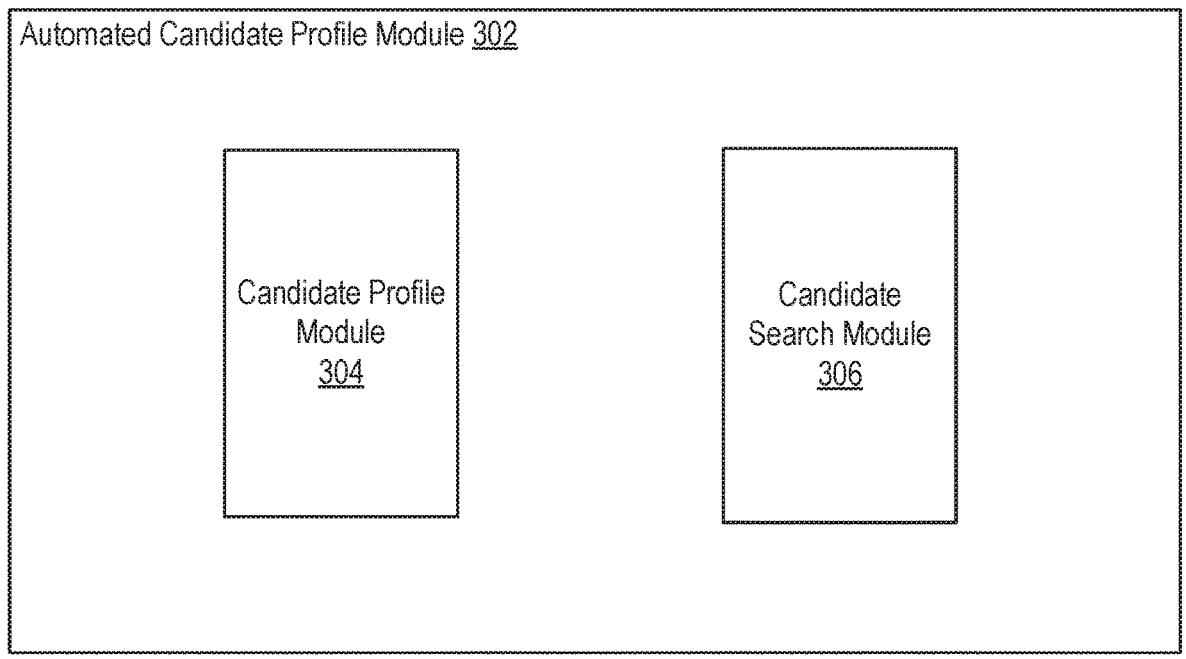
FIG. 3 illustrates an example automated candidate profile module, according to an embodiment of the present disclosure.

FIG. 3 illustrates an example automated candidate profile module 302 configured to automatically generate candidate profiles, according to an embodiment of the present disclosure. In some embodiments, the automated candidate profile module 106 of FIG. 1 can be implemented as the automated candidate profile module 302. As shown in the example of FIG. 3, the automated candidate profile module 302 can include a candidate profile module 304 and a candidate search module 306.

The candidate profile module 304 can be configured to automatically generate a candidate profile associated with a user. In an embodiment, the candidate profile module 304 can automatically generate a candidate profile for each employee of an organization. The candidate profile can include information that has been automatically obtained and/or inferred about the user. For example, any information provided in the user's resume when the user applied for employment with the organization can be included in the candidate profile. Such information can include, for example, educational history, previous employers, titles held at previous employers, skills obtained while working for previous employers, and the like. Additional information about a user that can be added to the user's candidate profile can include, for example, each team the user has been a part of within the organization, the title of the user within each team, how long the user was a member of each team, which teams that user has shown an interest in joining (e.g., teams that the user has bookmarked), previous employee questionnaire or survey responses provided by the user, and the like. In an embodiment, a user's skills can be inferred based on work product generated by the user. For example, each file that a user has checked into a code repository can be obtained. Based on file extensions of each file, a determination can be made as to which coding languages that user is proficient in. In an embodiment, a user can be provided with a user interface to modify information in the candidate profile of the user.

The candidate search module 306 can be configured to provide a candidate search interface that a user (e.g., team managers or team members) can use to search for potential candidates to fill available job positions. For example, a team manager can identify one or more keywords, or one or more filters to be applied to potential candidates. In various instances, a set of potential candidates can include candidates that are not employees of an organization and have applied for a particular position. In certain instances, if a job position is to be filled internally by an existing employee, the set of potential candidates can include a set of employees within an organization. The team manager can view a listing of potential candidates that satisfy the one or more keywords and/or the one or more filters. The team manager can click into a particular candidate profile to view details for a particular candidate. In an embodiment, candidate profiles that are surfaced by the candidate search interface may be photo-blind and/or name-blind so as to protect the identify of potential candidates. For example, a candidate's photo and/or name may not appear within the candidate profile so that teams identify candidates solely based on credentials, and not on identity related or physical traits.

Figure 4A:
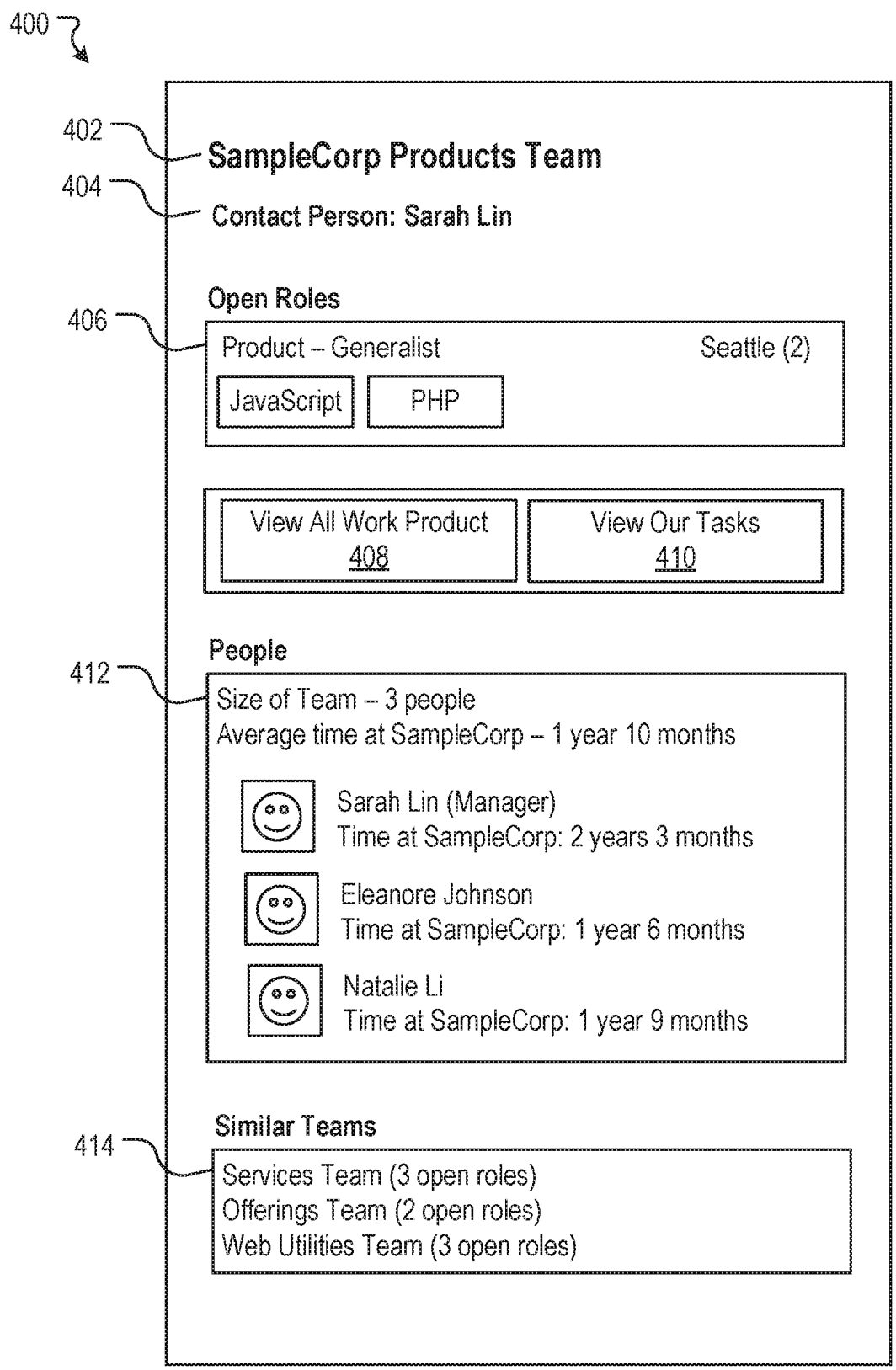

FIG. 4A illustrates an example job posting 400, according to an embodiment of the present disclosure. The example job posting 400 may be automatically generated, for example, by the automated job tool module 102. In an embodiment, the job posting 400 may be presented to a user through a user interface displayed on a computing device. The job posting 400 identifies a team 402 associated with the job posting, which, in this case, is the "Products Team" in an organization "SampleCorp." The job posting 400 also identifies a contact person 404. The job posting 400 includes various sections. In section 406, the job posting 400 indicates that there is an open role for a "Product Generalist," the position is located in Seattle, there are two job openings, and required skills include JavaScript and PHP. A first selectable button 408 allows a user viewing the job posting 400 to view work product created by the team. A second selectable button 410 allows a user to view tasks associated with the team. In section 412, the job posting 400 lists the size of the team, and identifies each team member in the team. In section 414, the job posting 400 lists teams that are similar to the Sample-Corp Products Team, and how many job positions are available in each of those teams.

Figure 4B:
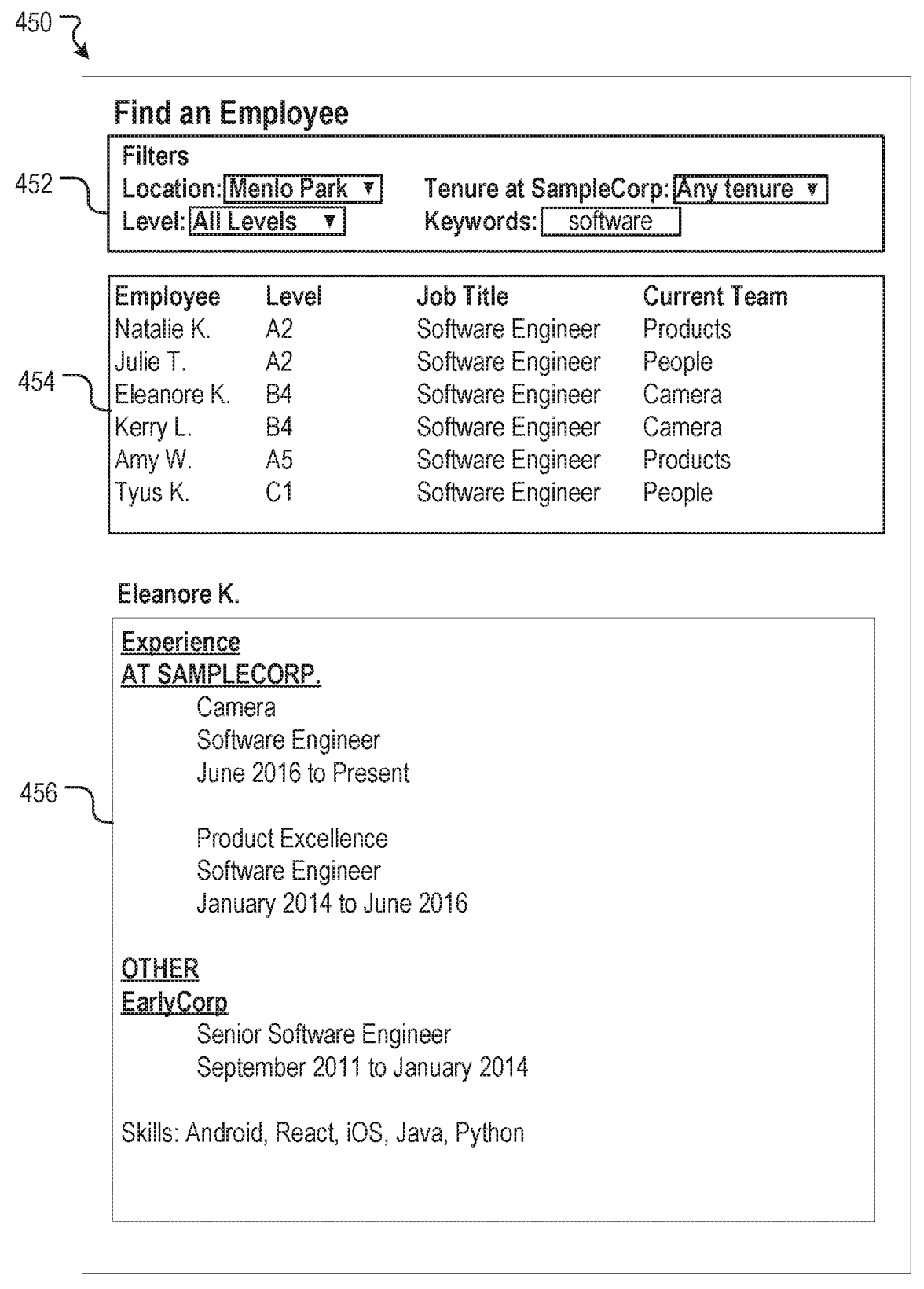

FIG. 4B illustrates an example candidate search interface 450, according to an embodiment of the present disclosure. The example candidate search interface 450 may be, for example, a candidate search interface provided by candidate search module 306. The candidate search interface 450 includes a set of filters 452. A user viewing the interface 450 can identify various filters and/or keywords to identify a set of potential candidates. In section 454 of the search interface 450, a set of search results are presented which includes a set of potential candidates. In the example interface 450, the set of potential candidates includes employees within an organization, SampleCorp., that are being considered to fill an available position. In section 456 of the search interface 450, a candidate profile associated with a candidate Eleanor K. is presented. The candidate profile includes information that was automatically obtained and/or inferred, for example, by the candidate profile module 304. In the example interface 450, such information includes Eleanor K.'s teams and positions at SampleCorp., as well as her previous employers, and a set of skills that have been automatically inferred based on Eleanor K.'s work product.

Figure 5:
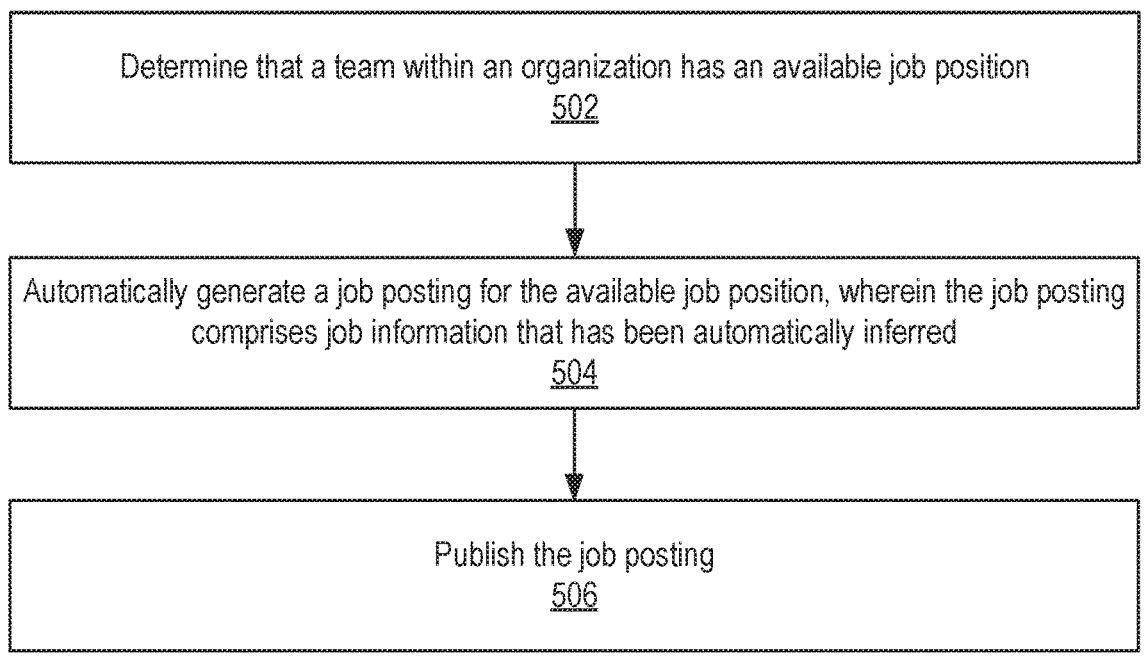
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can determine that a team within an organization has an available job position. At block 504, the example method 500 can automatically generate a job posting for the available job position, wherein the job posting comprises job information that has been automatically inferred. At block 506, the example method 500 can publish the job posting.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
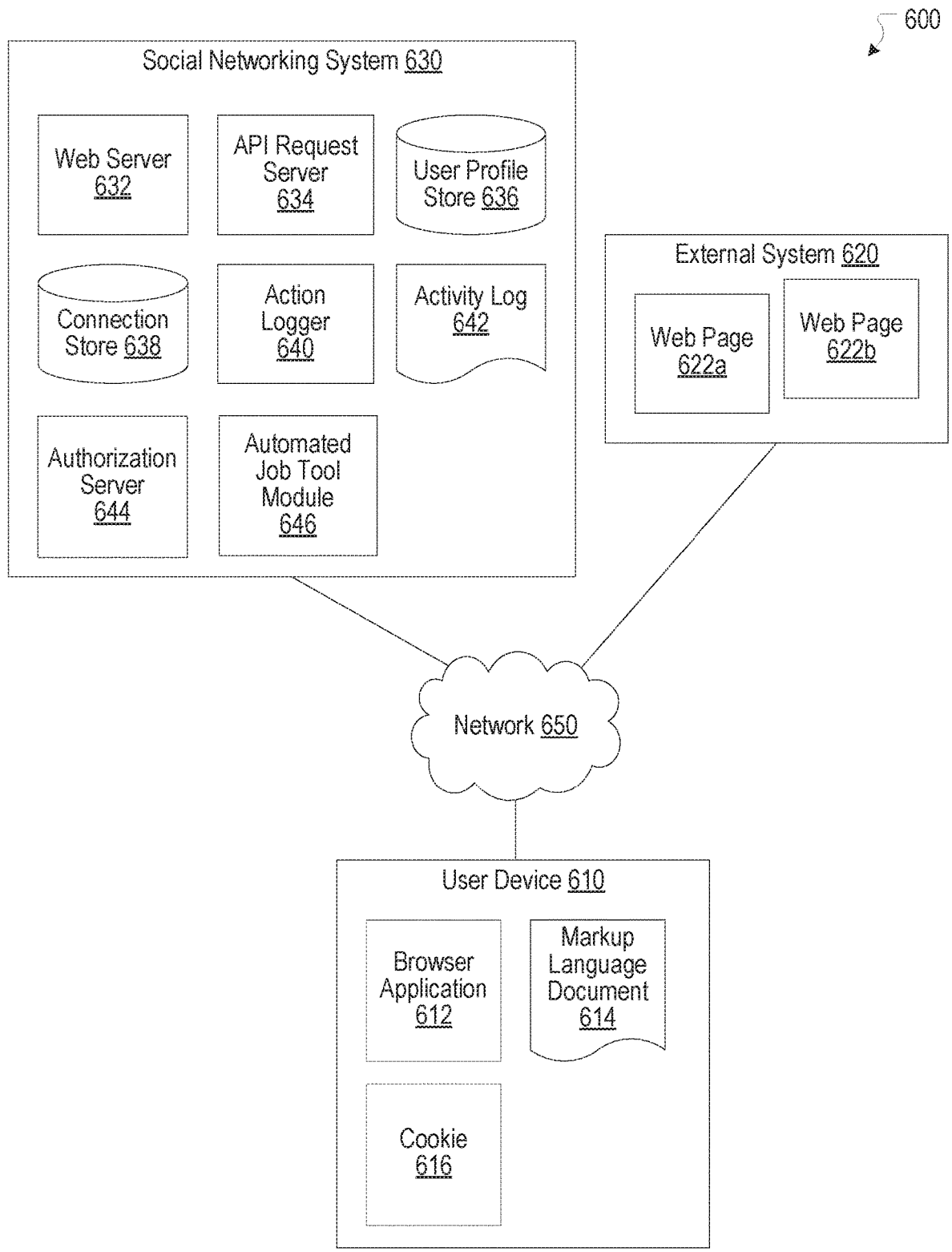
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an automated job tool module 646. The automated job tool module 646 can, for example, be implemented as the automated job tool module 102, as discussed in more detail herein. As discussed previously, it should be appreciated that there can be many variations or other possibilities. For example, in some embodiments, one or more functionalities of the automated job tool module 646 can be implemented in the user device 610. As discussed previously, it should be appreciated that there can be many variations or other possibilities.

Hardware Implementation

Figure 7:
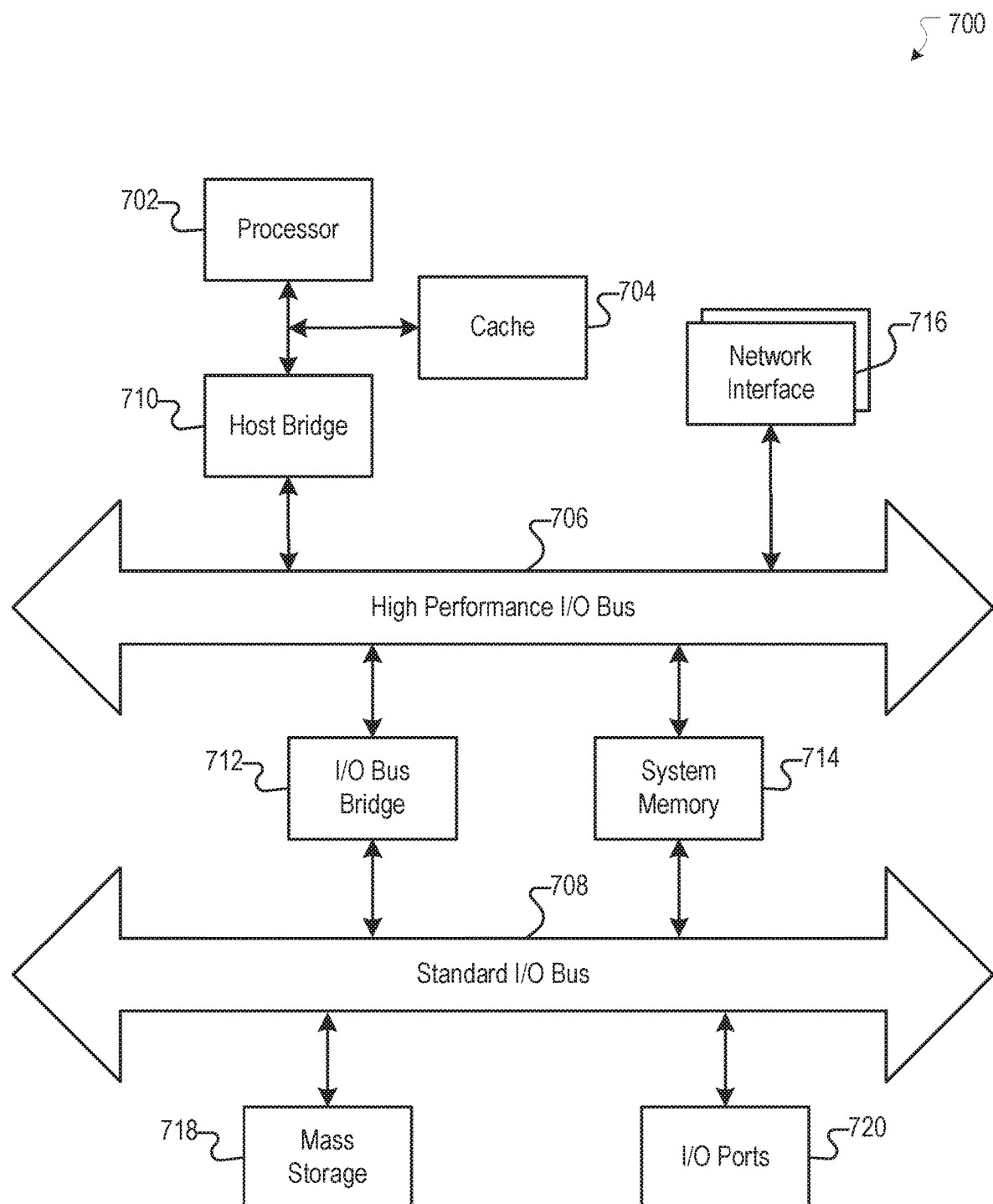
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, that a team within an organization has an available job position;
   generating, by the computing system, a job posting for the available job position, wherein the job posting comprises job information that has been automatically determined, wherein the generating the job posting comprises:
   identifying one or more work product, associated with one or more team members of the team, that are checked into a repository;
   determining one or more skills for the job posting based at least in part on a determination that the one or more work product are associated with a particular file extension and have been checked into the repository a number of times that satisfies a threshold within a predefined time period; and
   including the one or more skills in the job information as one or more skills associated with the job posting; and
   posting, by the computing system, the job posting.

2. The computer-implemented method of claim 1, further comprising identifying, by the computing system, the one or more team members associated with the team.

3. The computer-implemented method of claim 2, wherein the job posting identifies the one or more team members associated with the team.

4. The computer-implemented method of claim 1, further comprising:
   identifying, by the computing system, the team based on at least one of common team memberships or common courses taken between at least one team member of the team and at least one team member of another team.

5. The computer-implemented method of claim 1, further comprising identifying, by the computing system, a point of contact for the job posting based on a title associated with a team member.

6. The computer-implemented method of claim 1, wherein the determining that a team within an organization has an available job position comprises:
   determining that the team has an available job position based on how many team members are associated with the team.

7. The computer-implemented method of claim 1, wherein the determining that a team within an organization has an available job position comprises:
   determining an allocated headcount for the team;
   determining that the team has fewer team members than the allocated headcount for the team.

8. The computer-implemented method of claim 1, wherein the job posting allows a user to view the one or more work product, wherein the one or more work product are generated by the one or more team members of the team.

9. The computer-implemented method of claim 8, wherein the job posting allows the user to view at least one of comments or revisions to the one or more work product.

10. The computer-implemented method of claim 1, wherein the job posting comprises one or more tasks that have been selected by the team to be completed by job candidates that are not currently a member of the team.

11. A system comprising:
    at least one processor; and
    a memory storing instructions that, when executed by the at least one processor, cause the system to perform a method comprising:
    determining that a team within an organization has an available job position;
    generating a job posting for the available job position, wherein the job posting comprises job information that has been automatically determined, wherein the generating the job posting comprises:
    identifying one or more work product, associated with one or more team members of the team, that are checked into a repository;

determining one or more skills for the job posting based at least in part on a determination that the one or more work product are associated with a particular file extension and have been checked into the repository a number of times that satisfies a threshold within a predefined time period; and including the one or more skills in the job information as one or more skills associated with the job posting; and posting the job posting.

12. The system of claim 11, wherein the instructions, when executed by the at least one processor, further cause the system to perform: identifying the one or more team members associated with the team.

13. The system of claim 12, wherein the job posting identifies the one or more team members associated with the team.

14. The system of claim 11, wherein the instructions, when executed by the at least one processor, further cause the system to perform:
identifying the team based on at least one of common team memberships or common courses taken between at least one team member of the team and at least one team member of another team.

15. The system of claim 11, wherein the instructions, when executed by the at least one processor, further cause the system to perform: identifying a point of contact for the job posting based on a title associated with a team member.

16. A non-transitory computer-readable storage medium including instructions that, when executed by at least one processor of a computing system, cause the computing system to perform a method comprising:
determining that a team within an organization has an available job position;
generating a job posting for the available job position, wherein the job posting comprises job information that has been automatically determined, wherein the generating the job posting comprises:
identifying one or more work product, associated with one or more team members of the team, that are checked into a repository;
determining one or more skills for the job posting based at least in part on a determination that the one or more work product are associated with a particular file extension and have been checked into the repository a number of times that satisfies a threshold within a predefined time period; and
including the one or more skills in the job information as one or more skills associated with the job posting; and posting the job posting.

17. The non-transitory computer-readable storage medium of claim 16, wherein the instructions, when executed by the at least one processor, further cause the computing system to perform: identifying the one or more team members associated with the team.

18. The non-transitory computer-readable storage medium of claim 17, wherein the job posting identifies the one or more team members associated with the team.

19. The non-transitory computer-readable storage medium of claim 16, wherein the instructions, when executed by the at least one processor, further cause the computing system to perform:
identifying the team based on at least one of common team memberships or common courses taken between at least one team member of the team and at least one team member of another team.

20. The non-transitory computer-readable storage medium of claim 16, wherein the instructions, when executed by the at least one processor, further cause the computing system to perform: identifying a point of contact for the job posting based on a title associated with a team member.

* * * * *